United States Patent
Min et al.

(10) Patent No.: US 10,141,561 B2
(45) Date of Patent: Nov. 27, 2018

(54) SWELLING CURRENT INTERRUPT DEVICE

(71) Applicant: Hyundai Motor Company, Seoul (KR)

(72) Inventors: Hong Seok Min, Gyeonggi-do (KR); Ik Kyu Kim, Seoul (KR); Sung Min Choi, Gyeongsangbuk-do (KR); Seung Ho Ahn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 380 days.

(21) Appl. No.: 14/678,935

(22) Filed: Apr. 4, 2015

(65) Prior Publication Data

US 2016/0149201 A1    May 26, 2016

(30) Foreign Application Priority Data

Nov. 20, 2014   (KR) .................. 10-2014-0162958

(51) Int. Cl.
*H01M 2/34* (2006.01)
*H01M 10/04* (2006.01)
*H01M 10/052* (2010.01)
*H01M 10/0587* (2010.01)

(52) U.S. Cl.
CPC ....... *H01M 2/345* (2013.01); *H01M 10/0413* (2013.01); *H01M 10/0431* (2013.01); *H01M 10/052* (2013.01); *H01M 10/0587* (2013.01); *H01M 2200/20* (2013.01); *H01M 2220/20* (2013.01); *Y02E 60/122* (2013.01)

(58) Field of Classification Search
CPC .......................... H01M 2/345; H01M 10/0413
USPC .......................................................... 429/61
See application file for complete search history.

(56) References Cited

U.S. PATENT DOCUMENTS

| | | | |
|---|---|---|---|
| 2010/0068606 A1* | 3/2010 | Matthias | H01M 2/0275 429/61 |
| 2011/0104520 A1* | 5/2011 | Ahn | H01M 2/22 429/7 |
| 2012/0040235 A1 | 2/2012 | Cho et al. | |
| 2013/0196191 A1* | 8/2013 | Arai | H01M 2/06 429/61 |
| 2013/0337300 A1 | 12/2013 | Saito | |

FOREIGN PATENT DOCUMENTS

| | | |
|---|---|---|
| JP | 2001185124 A * | 7/2001 |
| JP | 2012-209204 A | 10/2012 |
| KR | 10-2008-0050642 A | 6/2008 |
| KR | 10-0874402 B1 | 12/2008 |
| KR | 10-2011-0048470 A | 5/2011 |
| KR | 10-2012-0013883 A | 2/2012 |
| KR | 10-2012-0064172 A | 6/2012 |
| KR | 10-2013-0136784 A | 12/2013 |

* cited by examiner

*Primary Examiner* — Sean P Cullen
(74) *Attorney, Agent, or Firm* — Mintz Levin Cohn Ferris Glovsky and Popeo, P.C.; Peter F. Corless

(57) ABSTRACT

A swelling current interrupt device (CID) includes: a battery unit connection terminal configured to be fixed to a pouch; and a lead tab connection terminal configured to be fixed to the pouch and electrically connected to the battery unit connection terminal, wherein any one of the battery unit connection terminal and the lead tab connection terminal is broken by an expansion force of the pouch which is generated when the pouch expands to interrupt the electrical connection between the battery unit connection terminal and the lead tab connection terminal.

1 Claim, 4 Drawing Sheets

SWELLING CURRENT INTERRUPT DEVICE

CROSS-REFERENCE TO RELATED APPLICATION

This application claims the benefit of and priority to Korean Patent Application No. 10-2014-0162958, filed on Nov. 20, 2014 in the Korean Intellectual Property Office, the disclosure of which is incorporated herein in its entirety by reference.

TECHNICAL FIELD

The present disclosure relates to a swelling current interrupt device (CID), and more particularly, to a swelling CID which is broken by an expansion force generated at the time of expanding a pouch to prevent a pouch cell-type secondary battery from being damaged.

BACKGROUND

As applications for pouch-type lithium ion secondary batteries have expanded, an energy density and storage amount in the unit cell have increased. In particular, to meet the recent demands for an increase in driving distance, high energy technologies have been applied to a lithium ion secondary battery for a vehicle.

However, as the energy of a lithium ion battery increases, safety of the lithium ion battery can be compromised. That is, as the amount of energy which may be stored is increased, the number of risk factors, such as ignition and explosion, also increases. In particular, in the case of a pouch cell which does not have cell level safety devices (e.g., a current interrupt device (CID), a positive temperature coefficient thermistor (PTC), a fuse, and the like), but yet has an exterior material with weak physical strength, safety issues corresponding to the increase in energy have occurred.

SUMMARY

The present disclosure has been made to solve the above-mentioned problems occurring in the related art while advantages achieved by the related art are maintained intact.

An aspect of the present disclosure provides a swelling CID capable of securing cell level safety for a pouch cell.

According to embodiments of the present disclosure, a swelling CID includes a battery unit connection terminal configured to be fixed to a pouch; and a lead tab connection terminal configured to be fixed to the pouch electrically connected to the battery unit connection terminal, wherein any one of the battery unit connection terminal and the lead tab connection terminal is broken by an expansion force of the pouch which is generated when the pouch expands to interrupt the electrical connection between the battery unit connection terminal and the lead tab connection terminal.

The battery unit connection terminal may extend from a battery unit embedded in the pouch to connect the battery unit to a component.

The battery unit may have a wound jelly-like shape.

The battery unit connection terminal may include: a bent surface part configured to contact the lead tab connection terminal, be bent to guide a deformation of the battery unit connection terminal, and protrude toward a lower surface of the battery unit connection terminal, and a bonding part configured to be bonded to the lead tab connection terminal and the pouch.

An upper surface of the battery unit connection terminal may be bonded to the pouch, and a rest part of the lead tab connection terminal, excluding a cut part in a lower surface of the lead tab connection terminal, may be attached to the pouch.

The cut part may be provided with a V-notch which guides a cutting of the lead tab connection terminal.

Furthermore, according to embodiments of the present disclosure, a pouch cell including a battery unit, a lead tab for connecting the battery unit to a component, and a pouch packaging the battery unit includes: a swelling current interrupt device (CID) configured to be equipped between the battery unit and the lead tab so as to be broken by an expansion force of the pouch which is generated when the pouch expands.

The swelling CID may include: a battery unit connection terminal configured to be electrically connected to the battery unit, and a lead tab connection terminal configured to be electrically connected to the battery unit connection terminal and electrically connected to the lead tab.

The battery unit connection terminal may be provided with a bent surface part having a shape deformed along an expansion direction of the pouch when the pouch expands, and the lead tab connection terminal may be provided with a cut part along the bent surface part when the pouch expands and is separated from the lead tab connection terminal.

The cut part may be provided with a V-notch which guides a cutting of the lead tab connection terminal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
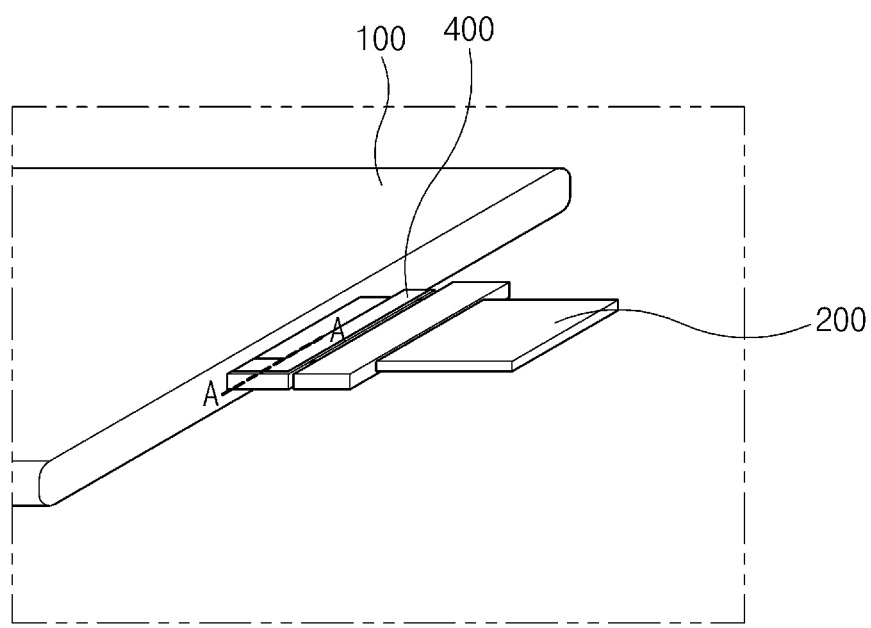
FIG. 1 is a perspective view of main parts of a pouch cell with which a swelling CID according to embodiments of the present disclosure is equipped.
Figure 2:
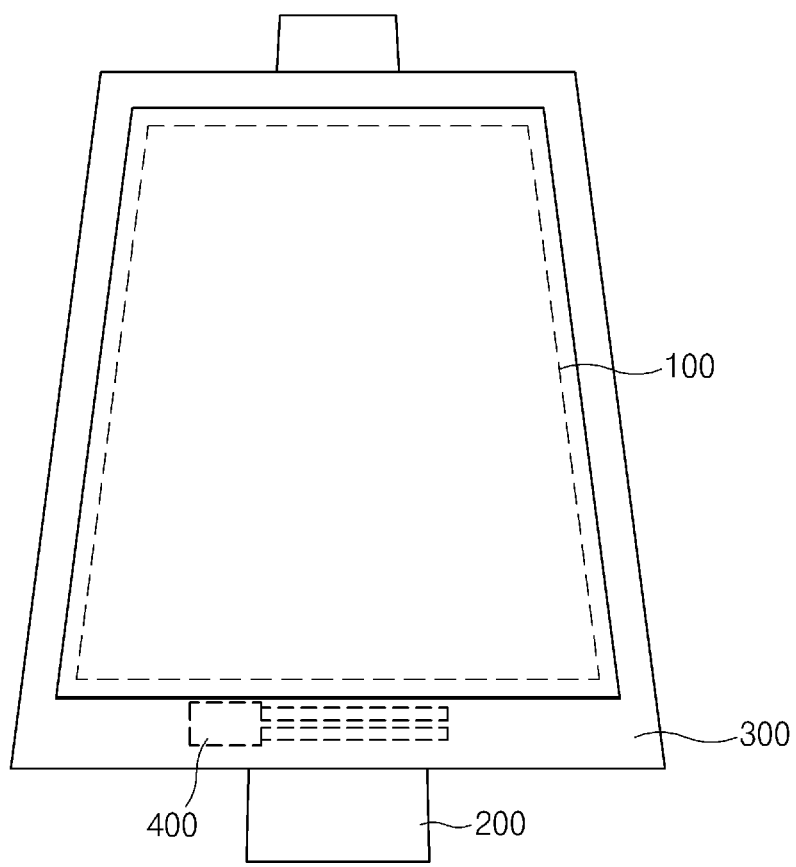
FIG. 2 is another perspective view of the swelling CID of FIG. 1.

Embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

As illustrated in FIGS. 1 to 4, a swelling CID according to embodiments of the present disclosure includes a battery unit connection terminal 410 configured to be fixed to a pouch 300 and a lead tab connection terminal 420 configured to be fixed to the pouch 300 and electrically connected to the battery unit connection terminal 410. In this case, any one of the battery unit connection terminal 410 and the lead tab connection terminal 420 is broken by an expansion force of the pouch 300 which is generated at a time of expanding the pouch 300 to interrupt the electrical connection between the battery unit connection terminal 410 and the lead tab connection terminal 420.

According to embodiments of the present disclosure, the battery unit connection terminal 410 extends from the battery unit 100 to connect the battery unit 100 embedded in the pouch 300 to a component (e.g., a component outside of the pouch 300). The battery unit 100 is manufactured in a wound jelly-like shape, sometimes called a "jelly roll."

The battery unit connection terminal 410 includes a bent surface part 411 configured to contact the lead tab connection terminal 420, be bent to guide a deformation of the battery unit connection terminal 410, and protrude toward a lower surface of the battery unit connection terminal 410 and a bonding part 412 configured to be bonded to the lead tab connection terminal 420 and the pouch 300.

An upper surface of the battery unit connection terminal 410 is bonded to the pouch 300 and a rest part 422 of the lead tab connection terminal 420, excluding a cut part 421 in the lower surface of the lead tab connection terminal 420, is attached to the pouch 300. The cut part 421 is provided with a V-notch 423 which guides the cutting of the lead tab connection terminal 420.

Further, the swelling CID according to embodiments of the present disclosure configured as described above is equipped in the pouch cell which includes the battery unit 100, the lead tab 200 which connects the battery unit 100 to a component, and the pouch 300 packaging the battery unit 100, such that the pouch cell having the swelling CID 400 embedded therein may be provided.

Figure 3:
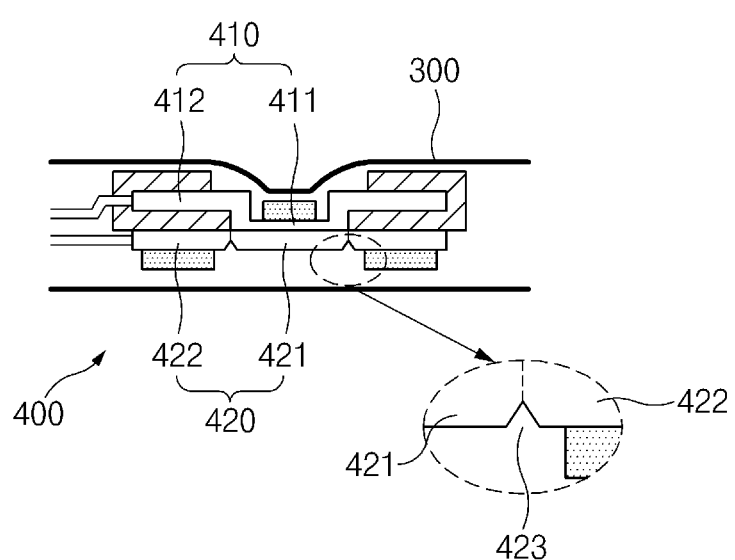
FIG. 3 is a cross-sectional view taken along the line A-A of FIG. 1.
Figure 4:
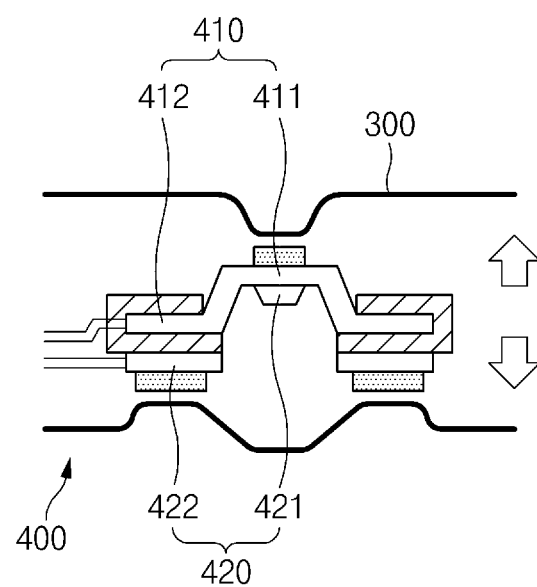
FIG. 4 is another cross-sectional view taken along the line A-A of FIG. 1.

In this configuration, the swelling CID 400 according to embodiments of the present disclosure is broken by the expansion force of the pouch 300 which is generated at the time of expanding the pouch 300 to prevent the battery unit 100 from being damaged (e.g., see FIGS. 3 and 4). According to the swelling CID 400 according to embodiments of the present disclosure as described above, the pouch 300 is expanded when gas is generated by overcharging or abnormal reaction and the electrical connection between the battery unit 100 and the component is interrupted by the expansion force of the expanded pouch 300.

In this case, the bent surface part 411 of the battery unit connection terminal 410 which is connected to the pouch 300 and the rest part 422 other than the cut part 421 in the lower surface of the lead tab connection terminal 420 are expanded along with the pouch 300 and thus a shape thereof is deformed. The cut part 421 of the lead tab connection terminal 420 is bent along the V-notch 423 by the expansion force of the pouch 300 which pulls the bent surface part 411 of the battery unit connection terminal 410 and moves, being attached to the bent surface part 411. Therefore, the electrical connection between the battery unit connection terminal 410 and the lead tab connection terminal 420 is broken and the damage of the battery unit 100 due to the overcharging or the abnormal reaction is prevented.

As described above, according to the swelling CID in accordance with embodiments of the present disclosure, the battery unit is physically short-circuited from another component at the time of expanding the volume of the pouch cell due to the overcharging, and the like, and thus the electrical connection between the battery unit and the component is interrupted, thereby securing the level safety of the pouch cell. Further, the existing cell level safety devices for securing the level safety of the pouch cell are restrictively applied to the secondary battery module or the secondary battery pack, but the present disclosure may be applied to the unit battery which is configured of each pouch cell. Further, according to embodiments of the present disclosure, the swelling CID is positioned between the battery unit and the lead tab which connects the battery unit to the component, and thus may be conveniently applied. Therefore, the swelling CID may also be applied to the secondary battery module or the secondary battery pack.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A pouch cell including a battery unit, a lead tab for connecting the battery unit to a component, and a pouch packaging the battery unit, comprising:
    a swelling current interrupt device (CID) configured to be equipped between the battery unit and the lead tab so as to be broken by an expansion force of the pouch which is generated when the pouch expands,
    wherein the swelling current interrupt device comprises:
        a battery unit connection terminal being fixed to the pouch; and
        a lead tab connection terminal being fixed to the pouch, and electrically connected to the battery unit connection terminal,
        wherein the battery unit connection terminal includes a bent surface part being bent to protrude toward the lead tab connection terminal, and a bonding part being bonded to the lead tab connection terminal and the pouch,
        wherein the lead tab connection terminal includes a cut part being attached to a lower surface of the bent surface part and a rest part being attached to the pouch, and
        wherein the cut part has a V-notch which guides a cutting of the lead tab connection terminal.

* * * * *